March 19, 1968
G. E. SIMS
3,373,958
AIRCRAFT TURN ENTRY
Filed Aug. 6, 1965
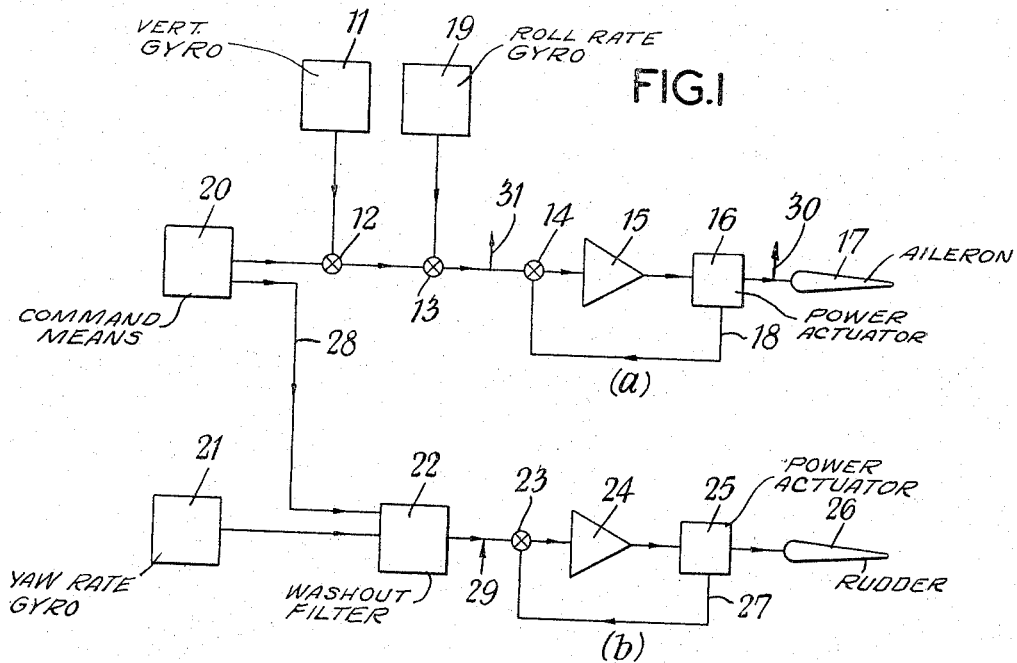
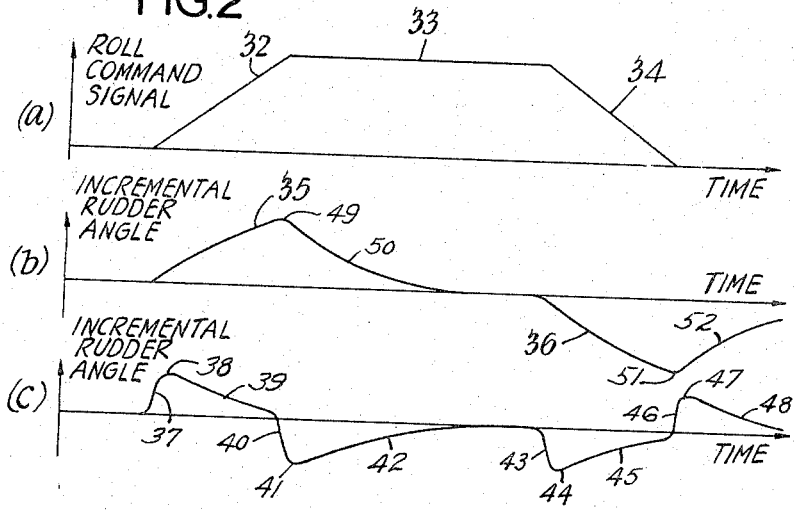
INVENTOR
GEORGE E. SIMS

United States Patent Office 3,373,958
Patented Mar. 19, 1968

3,373,958
AIRCRAFT TURN ENTRY
George E. Sims, Century Works, Lewisham,
London, SE. 13, England
Filed Aug. 6, 1965, Ser. No. 477,886
Claims priority, application Great Britain,
Aug. 10, 1964, 32,478/64
2 Claims. (Cl. 244—77)

ABSTRACT OF THE DISCLOSURE

An aircraft control system having an aileron control loop and a rudder control loop, which latter includes a yaw rate gyro and a wash-out filter having yaw rate as its input, and interconnects the aileron and rudder control loops by connecting the aileron loop roll command input to the input of the rudder loop wash-out filter. Rudder response upon termination of a turn is improved.

---

When an aircraft is flying in its correct attitude along a straight path, and a turn is commanded by the controls, either a manual control operated by the pilot or an automatic control, the natural aerodynamic characteristics of the aircraft result in a degree of side slip and a degree of yawing motion, which result in the turn being executed. However, if the aircraft yawing response to side slip is not sufficiently large, then a large transient side slip angle may occur, resulting in a delay in the initiation of the turn. The servo loop controlling the rudder channel usually contains a filter which includes a wash-out characteristic by which steady state signals, i.e., direct current signals, are gradually attenuated and progressively reduced to zero. Nevertheless, in initiating the turn the rudder signal is adverse and leads to a reduction in the turn demand. This mis-coordination of the various functions could reduce the stability of a heading mode when the command signal emanates from an automatic device, such as a compass.

The principal object of the invention is to provide an apparatus for controlling the turn entry of an aircraft which avoids these difficulties and the error which results from them.

As broadly claimed the apparatus of the invention for controlling the turn entry of an aircraft comprises an auto-pilot which includes an aileron servo loop controlled by a roll sensitive device to actuate the aircraft aileron and a rudder servo loop controlled by a yaw sensitive device to actuate the aircraft rudder, the rudder servo loop including a filter having a wash-out characteristic, means to apply a roll control signal to command an aircraft turn, and means to add a supplementary control signal from the command means to the rudder control signal via a filter having a washout characteristic from the yaw sensitive device. The supplementary control signal is preferably added upstream of the said filter.

One form of the invention will now be described, with reference to the accompanying drawings in which—

FIGURE 1 shows diagrammatically a part of the auto-pilot control apparatus for an aircraft, including an aileron servo loop (a) and a rudder servo loop (b); and FIGURE 2 shows a series of graphs to explain the operation of the invention.

Referring to FIGURE 1, certain parts of an auto-pilot installation are illustrated diagrammatically. A vertical gyroscope 11 provides signals corresponding to the vertical attitude of the aircraft and these are fed to a mixer 12 from which they pass through a second mixer 13 to a third mixer 14 and thence to an amplifier 15 the output of which is applied to a power actuator 16, which latter controls the ailerons 17. The usual position feedback signal from the power actuator 16 is passed via a line 18 back to the third mixer 14 and thence to the input of the amplifier to cancel the command signal when the required movement has been executed. A rate-of-roll gyroscope 19 provides a velocity damping signal which is applied to the second mixer 13 in co-operation with the signal from the vertical gyroscope 11.

The above apparatus functions to keep the aircraft in a set attitude, which attitude may be changed by means of a signal from a command means 20 which may be initiated by the pilot by operation of the turn control on the auto-pilot controller, or compass or radio signals, dependent upon the desired mode of operation, the signal from the device 20 being normally fed through a command modifier and bank limiter which are not shown in the drawing. The form of the signal from the command means is shown in FIG. 2(a). The ramp 32 initiates the turn, portion 33 maintains a steady roll angle during the turn, and the ramp 34 terminates the turn.

The auto-pilot also contains a yaw rate gyroscope 21 whose signals are fed to a filter 22 which at least includes a wash-out characteristic. The filter 22 may be in the form of a high-pass or band-pass filter. The wash-out characteristic has the effect of progressively reducing to zero any steady state signals, i.e., direct current signals, which are applied from the gyroscope 21, so that a steady state command signal from the gyroscope 21 gradually dies away at the output of the filter 22. The output of the filter 22 is fed to a mixer 23 and thence to an amplifier 24 which feeds a power actuator 25 to actuate the rudder 26, the usual position control signal from the power actuator 25 being fed back via the line 27 to the mixer 23.

The various units indicated by the blocks in the diagram are all of a known kind, of which details may be found in books on the subject, and it is considered that no detailed explanation of the components of each individual block is necessary.

The advantageous control according to the invention is obtained by feeding an additional signal from the command means 20 via a line 28 to the input of the filter 22, but before discussing this in detail some reference to prior attempts to achieve a similar objective will be referred to.

One prior attempt involves cross-feeding the signal (FIG. 2(a)) from the command means into the rudder loop at point 29 in FIG. 1. The rudder response under these circumstances is depicted in FIG. 2(c) wherein it will be seen that rudder movement 42 in a negative sense with respect to the initial rudder movement 40 results at the end of the ramp signal portion 32, FIG. 2(a). Upon leaving the turn, as commanded by the ramp signal portion 34 of FIG. 2(a), reversal of rudder movement again occurs as is indicated by reference characters 44 and 46. It has been found that although this type of rudder response is satisfactory on entering the turn, it is less satisfactory and is objectionable to the pilot on leaving the turn. Instead, it is desirable to achieve a rudder response such as is indicated at 36 in FIG. 2(b) upon leaving the turn. FIG. 2(b) illustrates rudder response according to the present invention.

Attempts have also been made to achieve the object to which the invention is directed by feeding a signal corresponding either to aileron deflection from the point 30 or to aileron demand at the point 31, across to the rudder. The result may be satisfactory in entering and leaving turns but may result in troublesome excitations of the aircraft in turbulent weather conditions, since the signals at 30 or 31 emanate from within the attitude loop 11, 15, 16, 17, 19. The rudder response shown in FIG. 2(c) is a conventional response and is achieved, in FIG. 1, by applying the command signal at 28 directly to point 29 so that no modification of the command signal is effected by the filter 22. Thus, at the initiation of a turn, no signal is present from the yaw rate gyro 21 and the position feedback signal at 27 is also absent. As a result, rudder response is due initially entirely to the command signal 32 as shown in the early part of the portion 37 in FIG. 2(c). Due to inertia of the aircraft, an opposing signal starts slowly to build from the yaw rate gyro 21 and then rapidly rises until the command signal 32 is exceeded to cause the rudder to reverse its movement as indicated by the peak 38 in FIG. 2(c). At the same time, the position feedback signal at 27 is building and it, too, contributes somewhat to the time-position of the peak 38. Subsequent to the peak 38, the continuing increase in the ramp signal 32 is overcome by the combination of the yaw rate gyro signal and the position feedback signal to produce the decreasing rudder angle as at 39 in FIG. 2(c). As soon as the steady state portion 33 of the command signal is reached, inertia of the aircraft causes the yaw rate gyro signal to predominate to produce the sharply negative-going rudder response as indicated at 40 until the peak 41 occurs. Thereafter, the combination of the yaw rate signal and the position feedback signal causes the rudder angle to decay toward zero or null position as indicated by the reference character 42.

The system has now stabilized itself to the new reference 33 so that when the negative-going ramp portion 34 of the command signal is encountered, rudder response as at 43 is effected, being opposite in direction to the initial response 37. The sequence of events is now repeated, although in opposite sense, with the portions 44, 45, 46, 47 and 48 corresponding respectively to the portions 38, 39, 40, 41 and 42.

The above described rudder response is entirely conventional but will serve to illustrate the function of the wash-out filter 22 when the same is used to attenuate the command signal and the yaw rate gyro signal. The rudder response in the latter instance is shown in FIG. 2(b).

In FIG. 2(b), it will be appreciated that the rudder response is much more gradual in the portion 35 than in the corresponding portions 37, 38 and 39 of FIG. 2(c). The reason for this is due to the attenuation of both the command signal 32 and the yaw rate gyro signal due to the presence of the wash-out filter 22, plus the fact that this attenuation in and of itself reduces the signal emanating from the yaw rate gyro 21. The result is the much more gradual rudder response 35 and of course the lagged position feedback signal 27 also affects such response. When the peak 49 is reached and the command signal has reached its steady state value, 33, the effect of the wash-out filter 22 predominates to wash-out the steady state signal 33 ultimately to null the rudder angle as indicated by the reference character 50. The negative-going command ramp 34 then elicits the rudder response 36 followed by the peak 51 and portion 52 which correspond to the previously mentioned portions 49 and 50, although in opposite sense.

Throughout, one must consider the fact that the yaw rate gyro as well as the position feedback signal also will affect the rudder response. However, due to the attenuation of the command signal by the filter 22, yaw rate in particular and the magnitude of the resultant signal from the yaw rate gyro 21 is much reduced as compared with the situation in which command signal attenuation is not effected. In addition, of course, the yaw rate signal itself is attenuated and this furthers the amelioration of rudder response rate.

Insofar as the aileron channel is concerned, it is entirely conventional but aileron response to the command signal 32, 33, 34 will by inspection be seen to be similar to the rudder response of FIG. 2(c). That is to say, considering the fact that the rate gyro 19 is equivalent, in the aileron channel, to the rate gyro 21 in the rudder channel, the only difference insofar as the description above of FIG. 2(c) is concerned is that the aileron channel contains also the vertical gyro 11. Therefore, the aileron channel will respond similarly to the rudder channel (FIG. 2(c) with the command signal applied at 29 in FIG. 1) in the absence of attenuation of the command signal by the wash-out filter 22.

According to the invention the additional signal is fed from the roll command device 20 to the input of the filter 22 in such a sense as to augment the signal from the yaw rate gyroscope 21, but since it is fed into the input end of the filter 22 it is attenuated by the filter with the yaw rate gyroscope signal.

The crossfeed signal, when modified by the filter 7, has the characteristic indicated in FIGURE 2(b). It has the desired characteristic 35 to facilitate entry into the turn, but the effect of the filter 22 is to cause a rudder movement indicated at 36 on leaving the turn, this being in the negative sense with respect to the positive signal 35 at the beginning of the turn; and the negative signal 36 is just what is required.

The magnitude of the crossfeed signal is chosen to suit the particular air frame characteristics and yaw damper or rudder channel installation and may be varied with speed, altitude or other factors as required.

Various modifications may be made within the scope of the invention.

I claim:

1. In an aircraft turn control system including a roll control channel and a yaw control channel, said roll control channel including a roll actuator and means responsive to roll rate to produce a roll stabilizing signal to said roll actuator to oppose roll, said yaw control channel including a yaw actuator, and means responsive to yaw rate to produce a yaw stabilizing signal to said yaw actuator to oppose yaw, and a command signal generator having a command signal output to produce both yaw and roll of the associated aircraft, the improvement comprising, said command signal being connected to said roll actuator, and wash-out filter means for attenuation of said yaw stabilizing signal and said command signal, said wash-out filter means being connected, at its input end, to said yaw stabilizing and command signals and, at its output end, to said yaw actuator.

2. The system as defined in claim 1 wherein each said roll actuator and said yaw actuator include a power actuator, an amplifier driving said actuator, and position feedback means from the power actuator to the amplifier, the roll stabilizing and command signals being applied to the roll channel amplifier and the output of said washout filter means being applied to the yaw channel amplifier.

References Cited

UNITED STATES PATENTS

| | | | |
|---|---|---|---|
| 2,630,282 | 3/1953 | Halpert | 244—77 |
| 3,110,458 | 11/1963 | Bishop | 244—77 |

MILTON BUCHLER, *Primary Examiner.*

B. BELKIN, *Assistant Examiner.*